Figure 1:
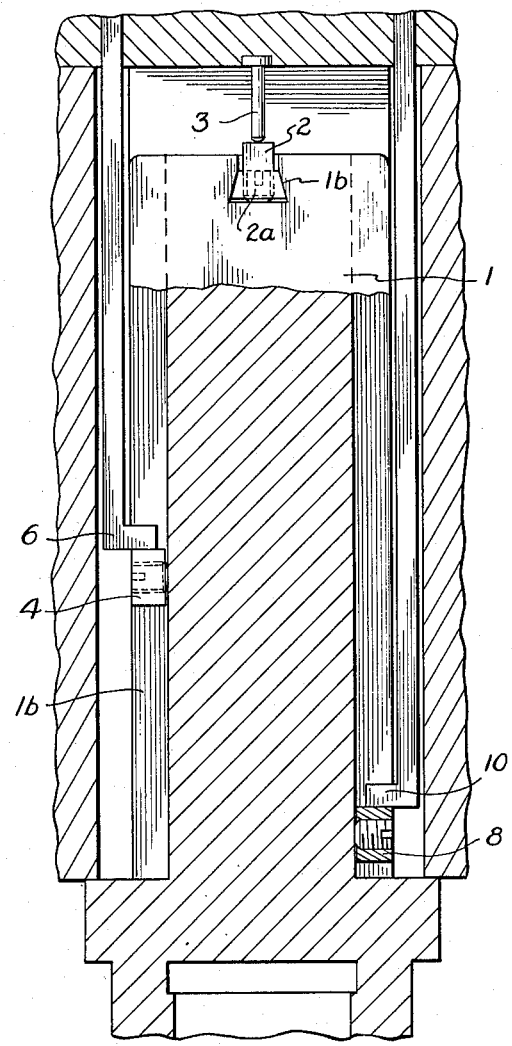

Aug. 11, 1964   O. OECKL ETAL   3,143,900
TOOL FOR AUTOMATICALLY OPERATED MACHINE TOOLS
Filed March 8, 1963

INVENTORS
*Otto Oeckl*
*Richard Purschke*
BY *Bailey, Stephens & Huettig*
ATTORNEYS United States Patent Office
3,143,900
Patented Aug. 11, 1964

3,143,900
TOOL FOR AUTOMATICALLY OPERATED
MACHINE TOOLS
Otto Oeckl and Richard Purschke, Munich, Germany, assignors to Maschinenfabrik Augsburg-Nurnberg A.G., Munich, Germany
Filed Mar. 8, 1963, Ser. No. 263,798
Claims priority, application Germany Mar. 27, 1962
4 Claims. (Cl. 77—1)

This invention relates to machine tools and, in particular, to a control tool for such machines.

In recent years, automatically operated machine tools have been used extensively. The majority of these machines are numerically programmed so that they follow a predetermined program through the successive working steps during which different cutting tools are available from storage.

The working or cutting tools are retrieved from their stored position by means of a conveyor or feed mechanism and are then coupled to the spindle of the machine tool. In the operation of presently used machine tools, at this time, the speed, the rate of feed, and the adjustment of the depth of cut for the respective tool have been set by commands given by an electronically controlled information center. The setting up of the control system is very costly, and it requires time and money to change the control instructions where, for example, the depth of cut for a tool has to be re-set following the re-sharpening of the tool.

The object of this invention is to produce means by which the working instructions for each tool in its respective working step can be set very simply.

In general, this invention is for a tool for use in an automatically operated machine tool, such as a drilling, shaping or milling machine, said tool having contacts on the body of the tool which, when the tool is coupled to the machine, cooperate with corresponding contacts in the machine for setting automatically the function of the machine for that particular tool, these functions being, for example, the machine speed, the rate of tool feed, and the depth of cut for the tool.

According to this invention, the machine operating cycle for each respective tool stored with the machine does not have to be programmed in the electrically operated information center in order to instruct the machine for the operation of that tool at any particular time. On the contrary, in this invention, each tool in itself is provided with the working instructions for that tool by means of contacts, and when the tool is coupled to the machine, its contacts, together with the coordinated corresponding contacts of the machine, automatically produce the corresponding adjustment of the machine for the working cycle of that particular tool.

A further feature of this invention is in that one contact is provided on the body of the tool for each working step while a plurality of coordinating contact points is mounted in the machine for each working step. According to this arrangement, the tool contact point meets the machine contact point that is specific for the working step of that tool, and therefore the machine automatically adjusts itself according to the position of the contact point on the tool coupled to the machine.

In order to avoid mistakes, the contacts for the individual working steps are mounted on different sides of the tool body. Also, the contacts on the tool are adjustable so that the tool can be set for fine work without any other adjustments.

Figure 2:
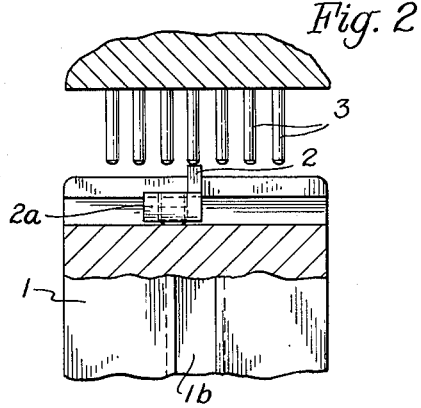
Figure 3:
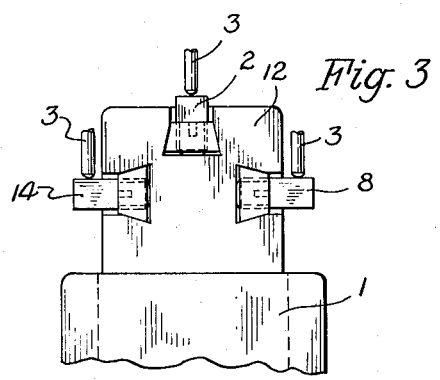
Figure 4:
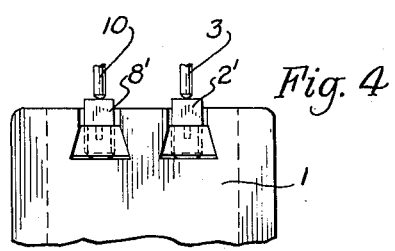

The means by which the objects of the invention are obtained are described more fully with reference to the accompanying drawing, in which:

FIGURE 1 is a fragmentary cross-sectional view of the shank of a tool inserted in a machine chuck;
FIGURE 2 is a side view of a portion of FIGURE 1;
FIGURE 3 is a detailed side view of a modified form of FIGURE 2; and
FIGURE 4 is a similar view of a further modified form of the invention.

As shown in FIGURE 1, on the end face of the shank 1 of a drill is a dovetail groove 1b in which is mounted a control contact peg 2 held in place by a set screw 2a. Peg 2 is adapted to bear against one of a plurality of corresponding contact pins 3 mounted in the machine tool. When the peg 2 engages a pin 3, the machine is set as to its drilling speed. Each of the respective contact pins 3 is for a different machine speed. Contact peg 2 on each respective drill tool is set always at that position on the drill shank at which it will contact a pin 3 corresponding to the machine speed for that drill tool.

Likewise, on each side face of the tool shank are dovetail grooves for other machine functions. As shown, on the left side of FIGURE 1, the peg 4 engages contact 6 to actuate the machine to feed the tool at an accelerated pace when bringing the tool to the workpiece. This arrangement is adjusted in such a way that, when the tool has been fed to the workpiece at the accelerated pace, then the feed of the tool is automatically slowed to advance at its cutting speed. The depth of cut of the tool in the workpiece is controlled by the contact peg 8 which engages its corresponding machine mounted pin 10. Contacts 4 and 8 are positioned in their dovetail grooves so that ordinary wear and tear on the tool is accounted for. Pins 6 and 10 are preferably spring-urged toward their respective pegs in the longitudinal direction of the tool. Thus these machine mounted pins can be used for various tools in which each tool has its pegs 4 and 8 set at different heights. The number of contacts on each tool can be increased so that the accelerated pace and working pace can follow one another automatically in rapid succession.

The arrangement and number of contacts, as well as the recitation of a drill tool, are only a representative example. Thus, as shown in FIGURE 3, the contact peg 2 is positioned in a dovetail groove located in a projection 12 formed on the end of the drill shaft. On one side of projection 12 is a groove holding the peg 8 for regulating the depth of cut, and on the other side of the projection is a groove holding an adjustable contact 14 for setting the rate of feed of the drill. All three pegs are adapted to engage a pin in a corresponding row of pins as shown in FIGURE 2.

A further modified form of the invention is shown in FIGURE 4 in which, on the end of the tool shank 1, are the plurality of dovetail grooves for holding the machine speed contact peg 2' and the rate of feed contact peg 8', these holding grooves being parallel and the pegs engage corresponding rows of machine pins. In each of the examples shown, the insertion of the tool into the machine automatically sets the working steps for that tool by means of the contact of the pegs on the tool with the pins in the machine chuck.

When the tool is re-sharpened, its resultant change in length is compensated for by adjusting the position of the corresponding contact pegs. Therefore, the tool, when re-inserted into a machine chuck, will automatically perform its originally planned operation.

Having now described the means by which the objects of this invention are obtained, we claim:

1. A tool for an automatically actuated machine tool such as a drilling machine, milling machine or shaping machine, comprising a tool body, and control contacts on said body for engaging corresponding contacts in a machine tool by which the operating functions of the machine tool are set, such as machine speed, rate of tool feed to the workpiece and depth of cut.

2. A tool as in claim 1, said control contacts on said body comprising one control contact for each machine tool function adapted to engage one of a plurality of contacts in said machine tool.

3. A tool as in claim 2, said control contacts being positioned on different sides of said body.

4. A tool as in claim 3, said control contacts being adjustably mounted on said body.

No references cited.